US008032597B2

(12) United States Patent
Khoo

(10) Patent No.: US 8,032,597 B2
(45) Date of Patent: Oct. 4, 2011

(54) ENHANCEMENT OF E-MAIL CLIENT USER INTERFACES AND E-MAIL MESSAGE FORMATS

(75) Inventor: Justin Khoo, Milpitas, CA (US)

(73) Assignee: Advenix, Corp., Milpitas, CA (US)

( * ) Notice: Subject to any disclaimer, the term of this patent is extended or adjusted under 35 U.S.C. 154(b) by 584 days.

(21) Appl. No.: 11/446,070

(22) Filed: Jun. 2, 2006

(65) Prior Publication Data

US 2007/0011258 A1 Jan. 11, 2007
US 2008/0005247 A9 Jan. 3, 2008

Related U.S. Application Data

(63) Continuation-in-part of application No. 10/667,103, filed on Sep. 17, 2003, now abandoned.

(60) Provisional application No. 60/411,835, filed on Sep. 18, 2002, provisional application No. 60/422,293, filed on Oct. 30, 2002, provisional application No. 60/457,407, filed on Mar. 25, 2003, provisional application No. 60/478,212, filed on Jun. 12, 2003, provisional application No. 60/480,076, filed on Jun. 20, 2003, provisional application No. 60/688,174, filed on Jun. 7, 2005.

(51) Int. Cl.
*G06F 15/16* (2006.01)
*G06F 3/048* (2006.01)

(52) U.S. Cl. ......... 709/206; 709/219; 709/229; 715/781

(58) Field of Classification Search .................. 709/206, 709/219, 229; 715/781
See application file for complete search history.

(56) References Cited

U.S. PATENT DOCUMENTS

| | | | | |
|---|---|---|---|---|
| 5,307,086 | A | 4/1994 | Griffin et al. | |
| 5,835,084 | A * | 11/1998 | Bailey et al. | 715/783 |
| 6,014,688 | A | 1/2000 | Venkatraman et al. | |
| 6,360,221 | B1 | 3/2002 | Gough et al. | |
| 6,546,417 | B1 | 4/2003 | Baker | |
| 6,915,332 | B1 * | 7/2005 | Zdepski | 709/206 |
| 7,003,734 | B1 | 2/2006 | Gardner et al. | |
| 7,047,502 | B2 | 5/2006 | Petropoulos et al. | |
| 7,130,885 | B2 | 10/2006 | Chandra et al. | |
| 7,386,535 | B1 * | 6/2008 | Kalucha et al. | 1/1 |
| 2003/0009569 | A1 * | 1/2003 | McIntyre et al. | 709/229 |
| 2003/0050933 | A1 * | 3/2003 | DeSalvo | 707/102 |
| 2003/0135659 | A1 * | 7/2003 | Bellotti et al. | 709/313 |
| 2003/0229667 | A1 * | 12/2003 | Pedersen et al. | 709/206 |
| 2004/0068545 | A1 * | 4/2004 | Daniell et al. | 709/206 |
| 2005/0143136 | A1 * | 6/2005 | Lev et al. | 455/566 |
| 2006/0168543 | A1 * | 7/2006 | Zaner-Godsey et al. | 715/835 |

* cited by examiner

*Primary Examiner* — Phuoc Nguyen
*Assistant Examiner* — Clarence John
(74) *Attorney, Agent, or Firm* — Barry N. Young

(57) ABSTRACT

An enhancement to e-mail user interfaces and message formats includes a dynamic preview window to view and retrieve attachments and summaries of e-mail messages directly in the e-mail list view or inbox view without opening an e-mail message. The efficient viewing mechanism further allows previews without cluttering the listing of the e-mails in the inbox by allowing the client to detect special preview instructions within an e-mail and run executables within the preview window. The enhancement is applicable to standalone e-mail clients (POP or IMAP based) and to web-based e-mail systems.

11 Claims, 19 Drawing Sheets

ENHANCEMENT OF E-MAIL CLIENT USER INTERFACES AND E-MAIL MESSAGE FORMATS

CROSS-REFERENCE TO RELATED APPLICATIONS

This application is a continuation-in-part of U.S. application Ser. No. 10/667,103, filed Sep. 17, 2003, now abandoned which claims the benefit of: Provisional Application Ser. No. 60/411,835, filed Sep. 18, 2002; Provisional Application Ser. No. 60/422,293, filed Oct. 30, 2001; Provisional Application Ser. No. 60/457,407, filed Mar. 25, 2003; Provisional Application Ser. No. 60/478,212, filed Jun. 12, 2003; and Provisional Application Ser. No. 60/480,076, filed Jun. 20, 2003; and further claims the benefit of U.S. Provisional Application Ser. No. 60/688,174, filed Jun. 7, 2005.

BACKGROUND

The present invention relates generally to the enhancement of e-mail user interfaces and message formats, and more specifically to providing a dynamic preview window for viewing summaries of e-mail messages and attachments without having to open the e-mail message E-mail is a very heavily used computer application program, and the number and size of e-mails are increasing every day. Recipients frequently must spend hours reading and responding to emails. Much of the increase in size is due to e-mail attachments. Because it is relatively easy to do, senders may add pictures, documents, and even video attachments to e-mails. E-mail recipients are frequently forced to guess the content of an e-mail from the subject line, and they are only notified of the present an attachment by a "paper clip" icon or the like. The user must usually open the e-mail to see its full content and to reply to the e-mail, as well as to determine the types and file names of any attachments. It is also necessary to open the e-mail in order to access the attachments, even though there may be no interest in the e-mail content itself. This requires invoking another application for each different type of attachment, and is very time consuming.

Standalone e-mail clients, such as Microsoft Outlook, have a static preview window or "reading pane" 112, as shown in FIG. 1*b*, that allows users to view portions of messages without having to open a new window for a selected message. Unfortunately, this reading pane suffers from several shortcomings. Firstly, it is a separate window that takes up a large amount of space on the display screen, which limits the amount of space available to list e-mails in the inbox view listing 111 of e-mails. Secondly, the reading pane is an operational mode of the Outlook e-mail application that is either turned on or off. It is not selectively activated for individual e-mails. Microsoft Outlook also has an "auto-preview" operating mode, where the entries for the e-mails in the inbox listing are expanded to show the first three lines of each e-mail in addition to the From and Subject lines. These lines take up a fixed amount of space in the inbox and the expanded entries reduce the number of e-mails visible in the inbox view. Auto-preview also does not allow access to attachments.

Common web-based e-mail systems normally only contain a static page listing of e-mails, and users have to click on the e-mail links to open the e-mail to retrieve the contents and any attachments. Certain enhanced web-based e-mail systems, such as OddPost and Microsoft's Web-based Outlook, may have static preview windows similar to that offered by the standalone clients. However, they also suffer from the drawback that these preview windows take up a large amount of space on the screen, and still require the e-mail and an appropriate application to be opened to access an attachment.

It is desirable to provide systems and methods that address the foregoing and other problems associated with e-mails by affording efficient mechanisms for quickly and efficiently previewing and responding to e-mails and attachments without cluttering the listing of the e-mails in a recipients' e-mail inbox and without requiring that e-mails be opened to interact with them. It is to these ends that the present invention is directed.

SUMMARY OF THE INVENTION

The invention affords a method and system for enhancing a user interface of e-mail clients to allow efficient preview of an e-mail in a list of e-mails. The invention enables users to preview the content associated with an e-mail on an inbox view listing of e-mails without opening the e-mail. The preview may be in a temporary preview window that appears only during activation by the user for a particular e-mail, and, therefore, does not require a constant dedicated display space on the e-mail listing. When deactivated, the preview window may disappear.

In other aspects, the invention may also allow an e-mail client to detect special preview instructions within an e-mail to access e-mail attachments within the preview window, and to run executables to render attachments such as pictures, video, or audio. The invention may also enable the e-mail client to handle special instructions embedded in the e-mail header or e-mail body which prompt the client to display customized applications within the preview windows that permit the user to interact with the applications to accomplish a task, such as controlling a video, filing out a form or completing an online transaction such as making a purchase.

In a further aspect, the preview window may overlay the e-mail inbox listing adjacent (preferably below) the entry for the e-mail being previewed, so that the user does not need to focus his attention to another part of the screen when viewing the preview window. The preview window may be activated by a trigger mechanism, such as a mouse-over or a click-action on an icon next to an e-mail entry in the listing, or by a mouse-over or click-action on the e-mail entry itself (for example the subject line). The preview window disappears upon the trigger mechanism being deactivated, as by the user moving the mouse cursor away from a triggering icon or the e-mail entry, or by a subsequent click on a triggering icon or e-mail entry, or upon some other action.

In a preferred embodiment, when a user initially positions a mouse cursor relative to the preview trigger a delay may be introduced before opening the preview window to prevent accidental triggering. A delay may also be introduced after the user moves his mouse away from the triggering icon or preview window before closing the preview window to allow the user some freedom in the movement of the mouse. Additionally, the invention may run applications and scripts that interact with remote services on a network and servers through the preview window.

DESCRIPTION OF PREFERRED EMBODIMENTS

This invention is particularly well adapted to enhancing e-mail user interfaces on standalone e-mail clients and on web-based e-mail clients, and will be described in that context. It will be appreciated, however, that this is illustrative of only one utility of the invention.

As is well known, there are multiple components of an e-mail system, notably the e-mail client, the e-mail server and transport systems that ensure an e-mail gets from one point to another. The e-mail client is normally referred to as the mail user agent (MUA) and the transport systems that store and forward e-mails are normally referred to as mail transfer agents (MTA). The invention is primarily concerned with the enhancement of e-mail clients or MUAs, and, therefore, this document will not describe the details of other less relevant parts of an e-mail system.

Figure 1A:
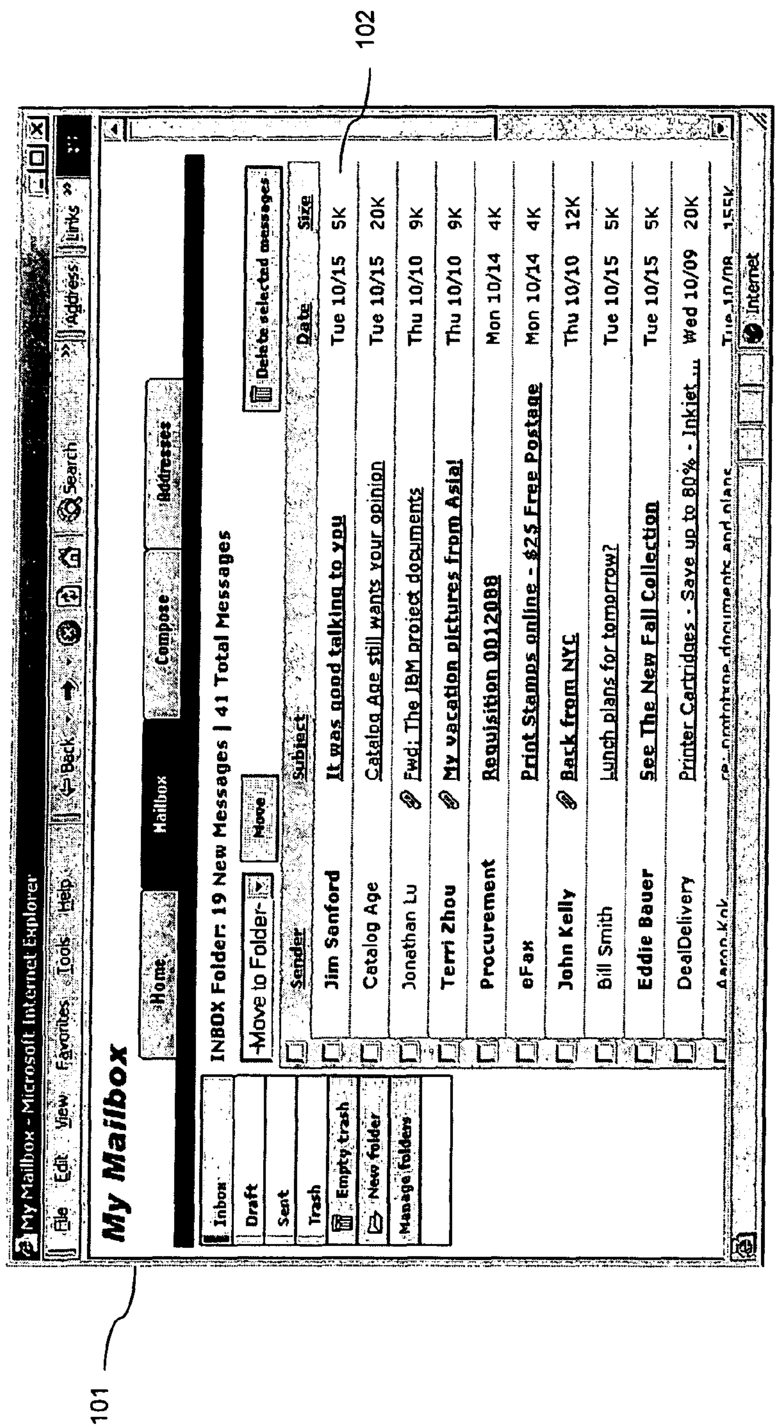
FIG. 1*a* shows an example of a known web-based e-mail client/system.
Figure 1B:
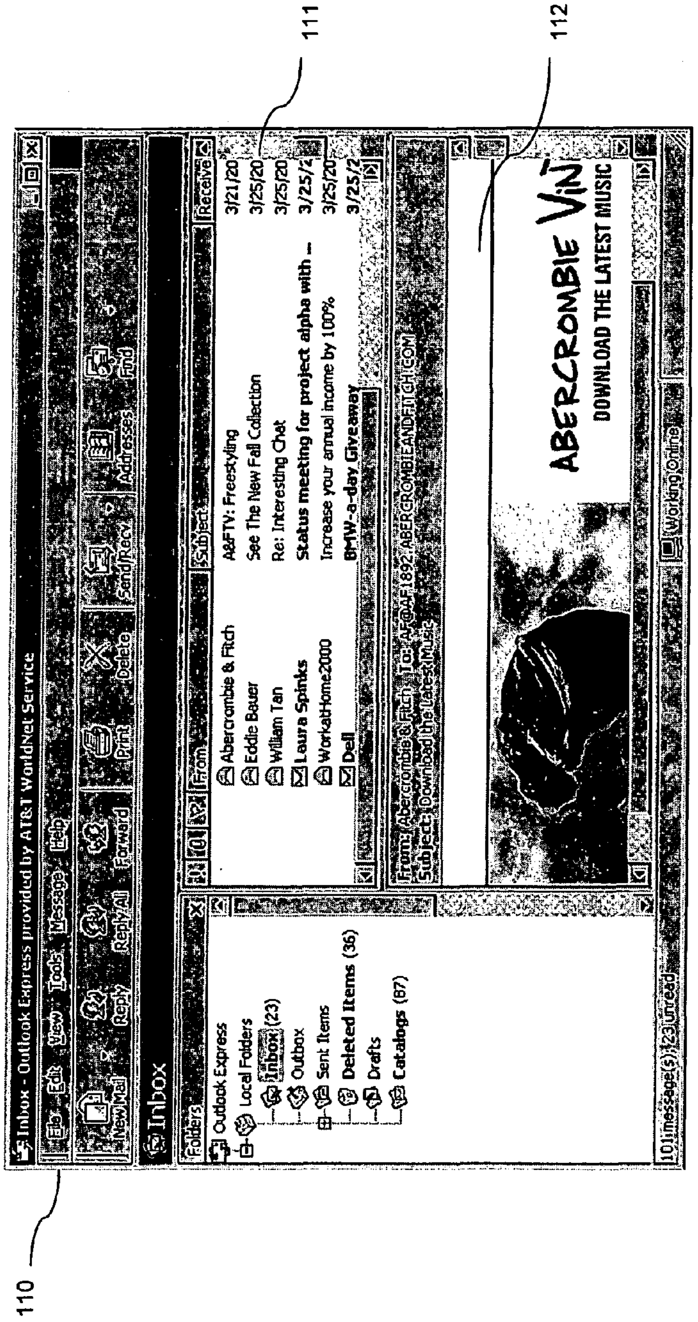
FIG. 1*b* shows a known implementation of a preview window in Microsoft Outlook.

Currently mail user agents (mail clients) fall within two categories, i.e., standalone e-mail clients, such as Microsoft Outlook, and web-based e-mail applications such as Hotmail and Yahoo mail. Standalone e-mail clients are installed on a user's computer and normally use the POP or IMAP protocol (some may use proprietary mechanisms such as Outlook's Hotmail connectivity) to receive e-mails from an e-mail server (mail store). Web-based e-mail applications are accessed through a web browser and the e-mail application (MUA) actually resides on the server where the e-mail is stored. FIGS. 1*a-b* respectively illustrate the MUAs for such e-mail systems.

Figure 2:
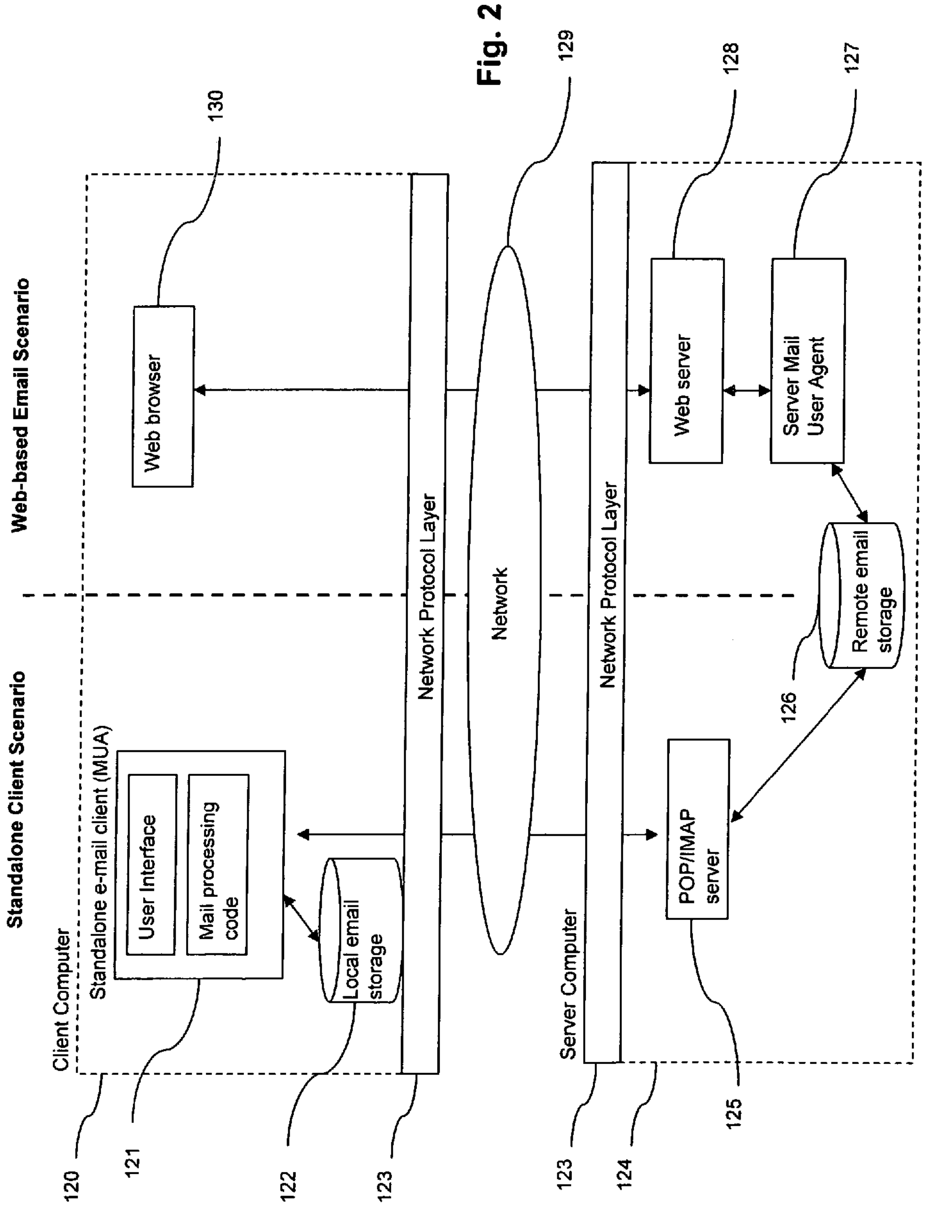
FIG. 2 is a diagrammatic view of standalone and web-based e-mail mail user agents and their related subsystems.
Figure 3:
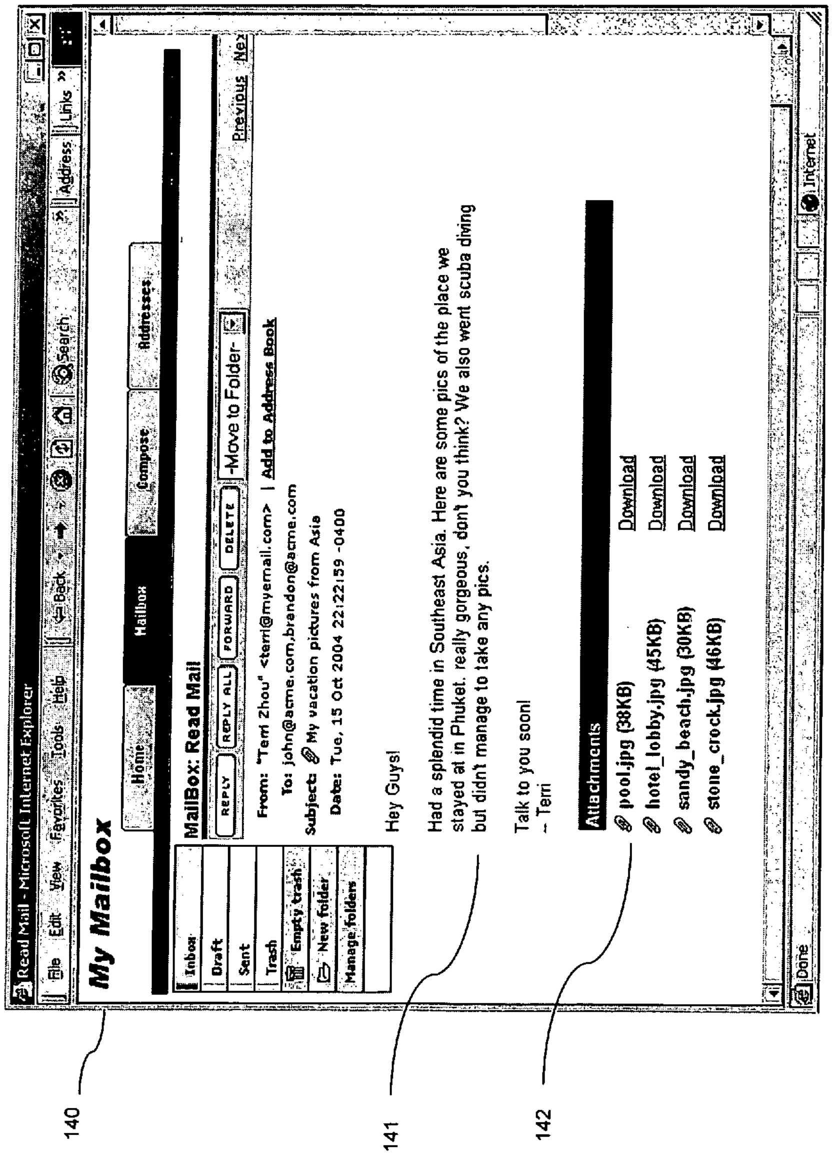
FIG. 3 illustrates an example of the contents of an e-mail that has been opened.

FIG. 2 is an illustration of standalone and web-based e-mail mail user agents and their related subsystems (not shown are outbound e-mail transports such as SMTP). The left side of the figure shows the setup of a typical standalone mail user agent 121 on a client computer 120, and the right side shows the setup of a typical web-based e-mail mail user agent 130 on the client computer.

For the standalone e-mail-client 121, a user interface allows a user to manage, read and compose e-mails, and mail processing code performs the necessary e-mail processing functions. A typical standalone e-mail client 121 may have a local e-mail data store 122 that stores the e-mail that has been retrieved from a remote e-mail data store 126 on a server computer 124 on the network 129. The mail processing code shown in FIG. 2 may be stored in conventional computer readable storage media for storing executable instructions for controlling the operation of the client computer. The standalone e-mail client retrieves the e-mail from the remote data store through a remote server 125 using a protocol such as POP, IMAP or a proprietary protocol such as used by Microsoft Exchange. Examples of standalone e-mail clients are Microsoft Outlook, Outlook Express, and the open source Thunderbird e-mail client.

In the case of a web-based e-mail application, the user accesses the e-mail application through a web-browser 130 on the computer 120 that is connected to the network 129 via a network protocol layer 123, such as HTTP or HTTPS. The browser connects to a remote server computer 124 that runs a web server 128 with a web-based e-mail application 127. Examples of web-based e-mail applications include the open source Horde e-mail application or Squirrel Mail. The web-based e-mail application 127 generates the necessary user interface that is displayed on the web browser 130. The web-based e-mail application 127 also connects to the e-mail data store 126 on the server computer 124 to parse and display the user's e-mail.

Figure 4A:
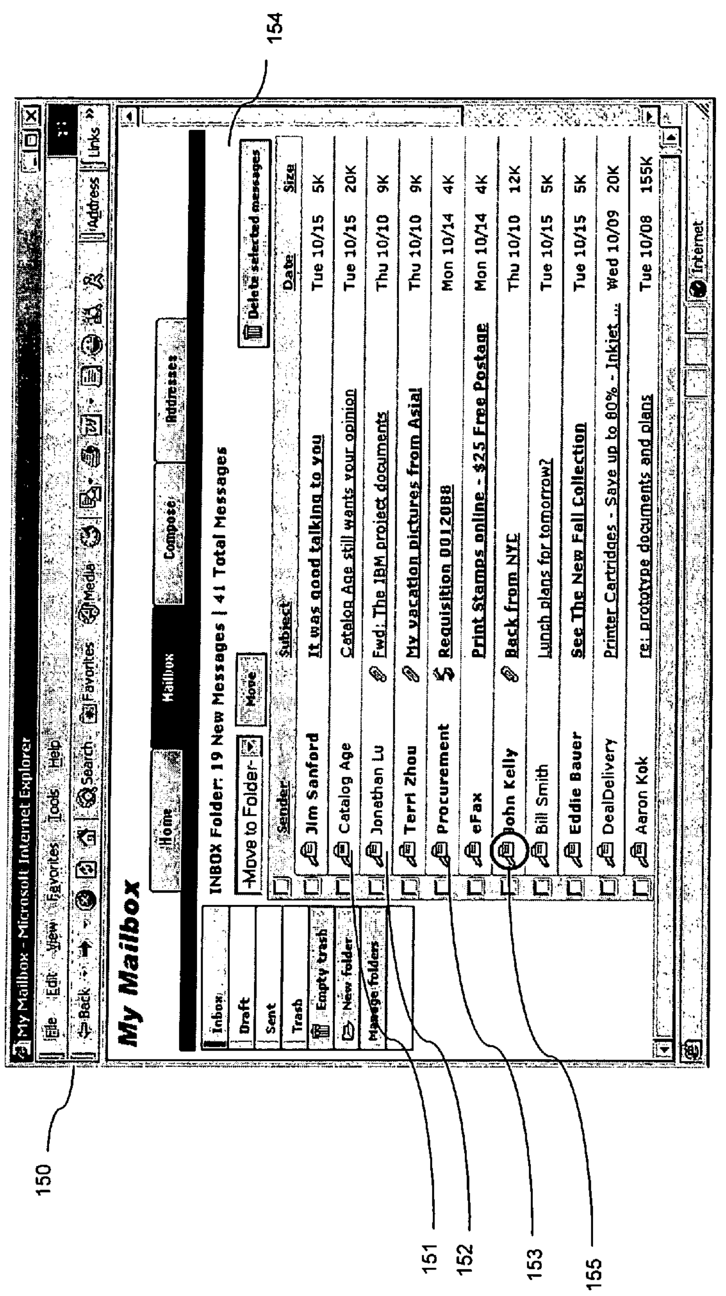
FIG. 4*a* illustrates a preview-enhanced e-mail user interface in accordance with the invention on a web-based client with preview trigger icons in the e-mail listing.
Figure 4B:
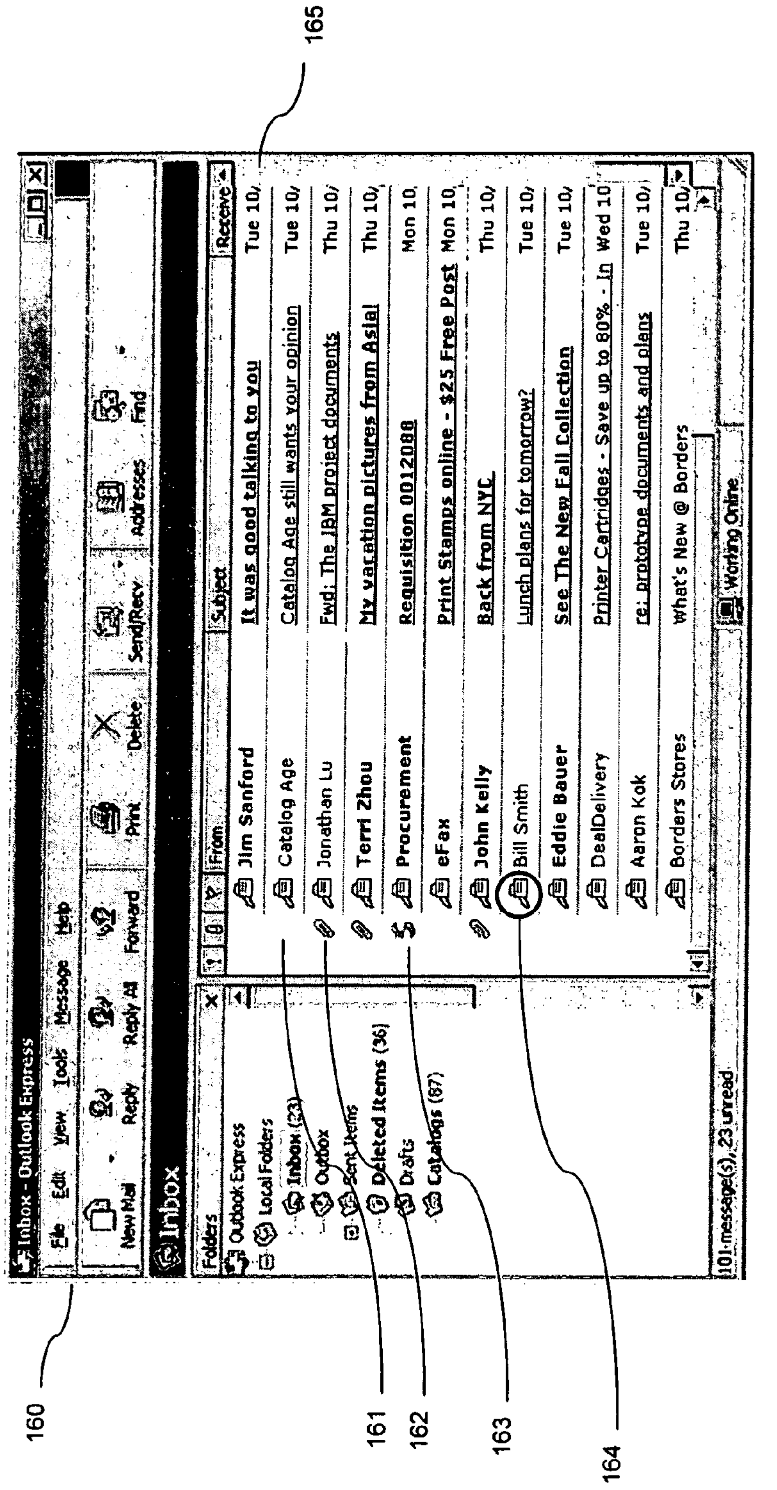
FIG. 4*b* illustrates a preview-enhanced user interface in accordance with the invention on a standalone e-mail client with preview trigger icons in the e-mail listing.

FIGS. 4*a* and 4*b* show embodiments of the present invention where the preview has not yet been triggered. FIG. 4*a* shows an embodiment of the invention for an e-mail list view (inbox view 154) of a web-based e-mail user interface 150. Within this inbox view, a plurality of e-mail entries may be listed in a well-know manner. One or more of the e-mail entries may include a triggering mechanism that allows the user to open a temporary preview window overlying the e-mail list view, as will be described, and render a preview of the e-mail without opening the e-mail. The triggering mechanism may be within an e-mail header, or may comprise, for example, an icon 155 within the e-mail entry located next to the header for the e-mail in the list. The e-mails may comprise a regular text or HTML e-mail 151 without attachments, an e-mail 152 containing attachments, and an e-mail 153 containing enhanced instructions, as will be explained in more detail later. FIG. 4*b* shows an embodiment of the invention for an e-mail list view of a standalone e-mail client 160. Within this e-mail list view 165, triggering icons 164 may be located next to e-mails in the list. The e-mails may similarly comprise a regular text or HTML e-mail 161 without attachments, an e-mail 162 containing attachments, and an e-mail 164 containing "enhanced instructions", as will be explained in more detail later.

Figure 5A:
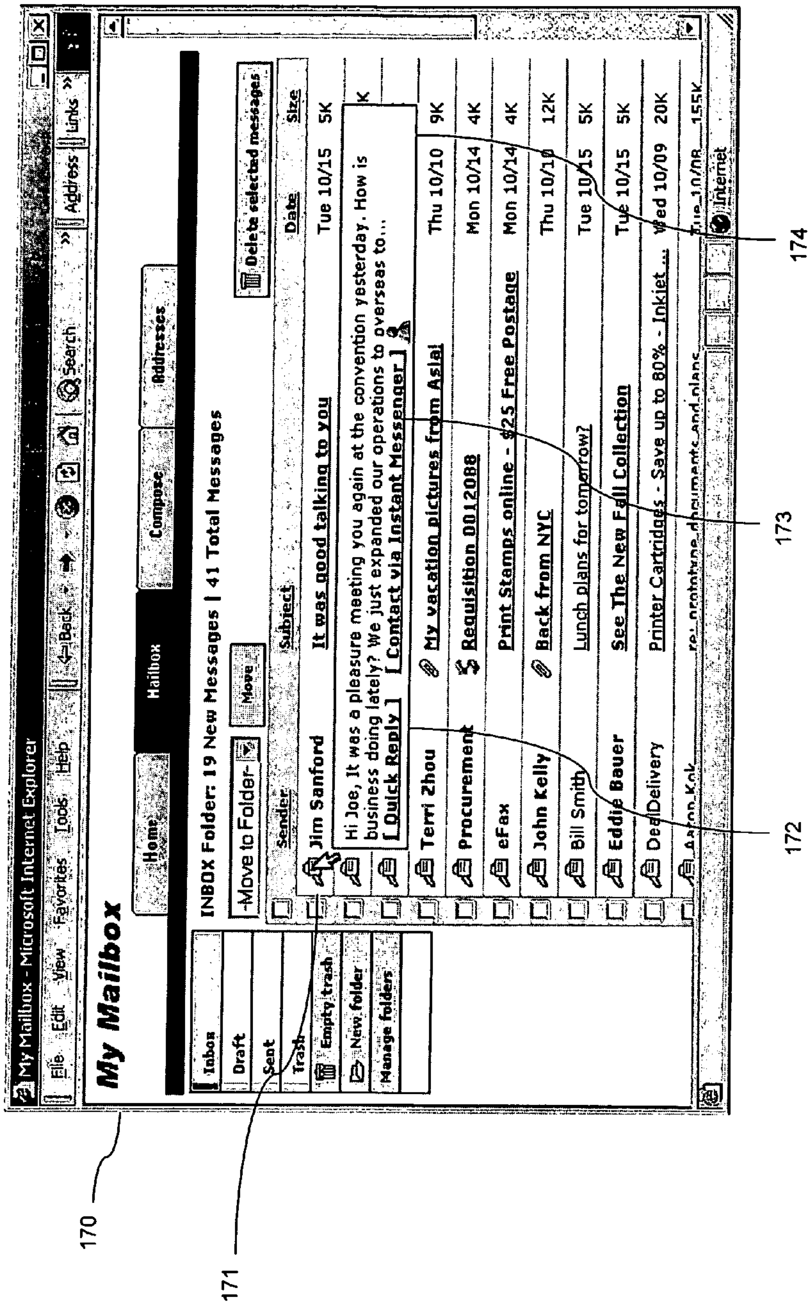
FIG. 5*a* illustrates a preview window in accordance with the invention rendering a summary of an e-mail.

FIG. 5*a*, which corresponds to FIG. 4*a*, shows an inbox view 170 that has a preview of an e-mail activated in a temporary preview window or layer 174 in accordance with the invention. Upon the user triggering a preview, as by placing a mouse cursor relative to, e.g., over, an email entry or the triggering icon 171 of an e-mail of interest, or clicking on the icon, the preview window 174 may be opened temporarily on the inbox view adjacent the e-mail being previewed and overlaying the e-mail listing, as shown. The e-mail content may be rendered in preview window 174 until the user de-activates the preview, as by moving the mouse cursor away from the preview window and/or the triggering icon. The preview may be produced, as will be described, without opening the e-mail. As used herein, the term "content" refers to selected text or other material within the body of an e-mail, as well as to indicators of attachments to the e-mail and links, if any, to enable extracting or rendering the attachments. As will be further described, the term "attachment" refers to any document or other materials such as multi-media or images associated with the e-mail.

In a preferred embodiment, upon the preview trigger being activated for a particular e-mail, the preview window opens temporarily on the inbox view adjacent the e-mail being previewed and overlays some of the e-mails in the list. In another possible embodiment, instead of a layer that overlays the listing of e-mails in an inbox view, the preview window may open adjacent an e-mail being previewed, e.g., below the e-mail, and push down the other e-mail entries in the inbox view so as not to obscure the emails in the list. This method has the advantage that the preview window does not obstruct any of the e-mails in the list, but may be less visually appealing. On a web-based email system, the preview can be achieved by displaying each email entry in an HTML table row, and when a preview mechanism is activated, inserting a row under the active email entry and displaying the preview content in a <DIV> within that new row. This will push down e-mail entries below the active email while the preview window takes up the space beneath the active email entry. On a desktop client, this can be achieved using a mechanism similar approach but with different components, such as by using a DataGrid in Visual Basic.

The preview window may display a text summary of an e-mail message's main body. In the example shown, the e-mail does not contain any attachments. However, the preview window may contain links 172, 173 to reply to the sender or to contact the sender through instant messaging. As will be described, the invention enables replies and instant messaging to be performed within the preview window without the necessity of opening the e-mail message. This conveniently improves the workflow speed and efficiency of handling e-mails.

Processes for creating, initializing and populating the preview window will be described later. First, however, a description of the functionality within the preview window will be provided.

On a web-based e-mail system, an "in window" preview window can easily be created by using layers or floating DIVs, or any other similar mechanism familiar to those skilled in the art. In a preferred embodiment of the invention, the preview window in a web-based e-mail interface is created using the JavaScript function call "document.createElement("div")" upon triggering of the preview mechanism. On a standalone e-mail client, the preview window may be created by issuing a routine call in the language of the e-mail client (such as Microsoft Foundation Classes graphical user interface components) to create a new window that is adjacent to, e.g., positioned below, the e-mail entry of interest. Preferably, the preview window of the standalone client and the web-based e-mail interface contain a browser component, so that it is capable of displaying content viewable in a web-browser, such as Internet Explorer. Therefore, the preview windows of both the standalone e-mail client and the web-based user interface may display similar content. The only difference is how the preview windows interact and communicate with the e-mail application itself.

Since a web-based e-mail interface is generated by a mail application resident on a mail server, any interactions with the preview window that necessitates real time update with new content requires a network call (preferably using HTTP or HTTPS) to the server to retrieve the contents. In a preferred embodiment of the invention, real time asynchronous updates of data from the e-mail server or from a third party application resident on the network may be achieved without the need to refresh the window or page by using the built in function XMLHttpRequest that is available on most browsers such as Internet Explorer 5+, Mozilla 1.0+ and Safari 1.2+(Internet Explorer exposes the functionality through the XMLHTTP ActiveXobject). The XMLHttpRequest may be invoked using JavaScript routines that fetch data from the server in an XML format and update any content in the preview window by modifying the document object model (DOM) properties of the window. Other mechanisms familiar to those skilled in the art may also be used to achieve asynchronous data fetches that do not require a page "refresh", or a reload may be used, such as by embedding a Java Applet within the preview window, or by using frames and iframes within the preview window to fetch data from a server. Certain routines may not require interactions with the server, and these routines may be executed locally on the browser through JavaScript routines.

For the preview window on the standalone client, the routines within the preview window may communicate or fetch data from the e-mail application through a plug-in mechanism. For example Microsoft Outlook exposes the e-mail application's functionality through MAPI, and any COM compliant application residing on the same machine may retrieve e-mail data through MAPI calls. In a preferred embodiment of the invention, the preview window's rendering browser may be Internet Explorer which contains an ActiveX object that relays calls to the underlying e-mail application through a mechanism similar to that offered by Microsoft's MAPI objects. When data needs to be fetched from the e-mail application, a JavaScript routine may be used to invoke an ActiveX proxy object initialized within the preview window to retrieve any data it requires from the e-mail application. The e-mail client may asynchronously update content within the preview window by, for example, refreshing the window or notifying the proxy object to update the content of the preview window. In order to obtain access to certain parts of an e-mail such as the header that Outlook's MAPI may not access, a third party library such as Outlook Redemption may be used. Other approaches to preview enhancements to standalone e-mail clients, e.g., Mozilla Thunderbird and Eudora, may be used depending on the programming interfaces exposed by such standalone clients.

The following are examples of code that may be compiled into the Outlook Proxy ActiveX Control written in Visual Basic. The code example below retrieves the subject text of an e-mail. As will be appreciated, a similar approach may be used to retrieve other e-mail content.

```
    Dim ol As Outlook. Application
    Dim ns As Name Space
    Dim InboxItems As Items
    Private Sub UserControl_Initialize( )
    Set ol = CreateObject("Outlook.App1ication")
    Set ns = ol.GetNamespace("MAPI")
    Set InboxItems = ol.Session.GetDefaultFolder(6).Items
End Sub
    'getE-mailSubject Function to get the subject of an e-mail and return to
    the caller
    Private Function getE-mailSubject(msgIndex As Integer) As String
    Dim oItem As MailItem
    Dim i As Integer
    Dim id, cnt As String
    getE-mailSubject = ""
    Set oItem = InboxItems(msgIndex)
    id = oItem.EntryID
    getE-mailSubject = oItem.Subject
End Function
```

Code inside the preview window HTML body that initializes the ActiveX Object and calls the functions in the ActiveX Object that may be used for realizing a part of an e-mail may be:

```
<!-- Include Outlook Proxy ActiveX Object -->
<OBJECT ID="Proxy" width=0 height=0
    CLASSID="CLSID: 39394398-242F-4B1B-BB23-B4AFBC8C84F1"
CODEBASE="OutlookProxy.CAB#version=1,0,0,3">
</OBJECT>
<script type="text/javascript">
function getE-mailSubject(msgIndex) {
    return Proxy.getE-mailSubject(msgIndex),
}
</script>
```

As will be explained, certain routines may not require a connection to the main e-mail application, but rather to other third party applications.

Figure 5B:
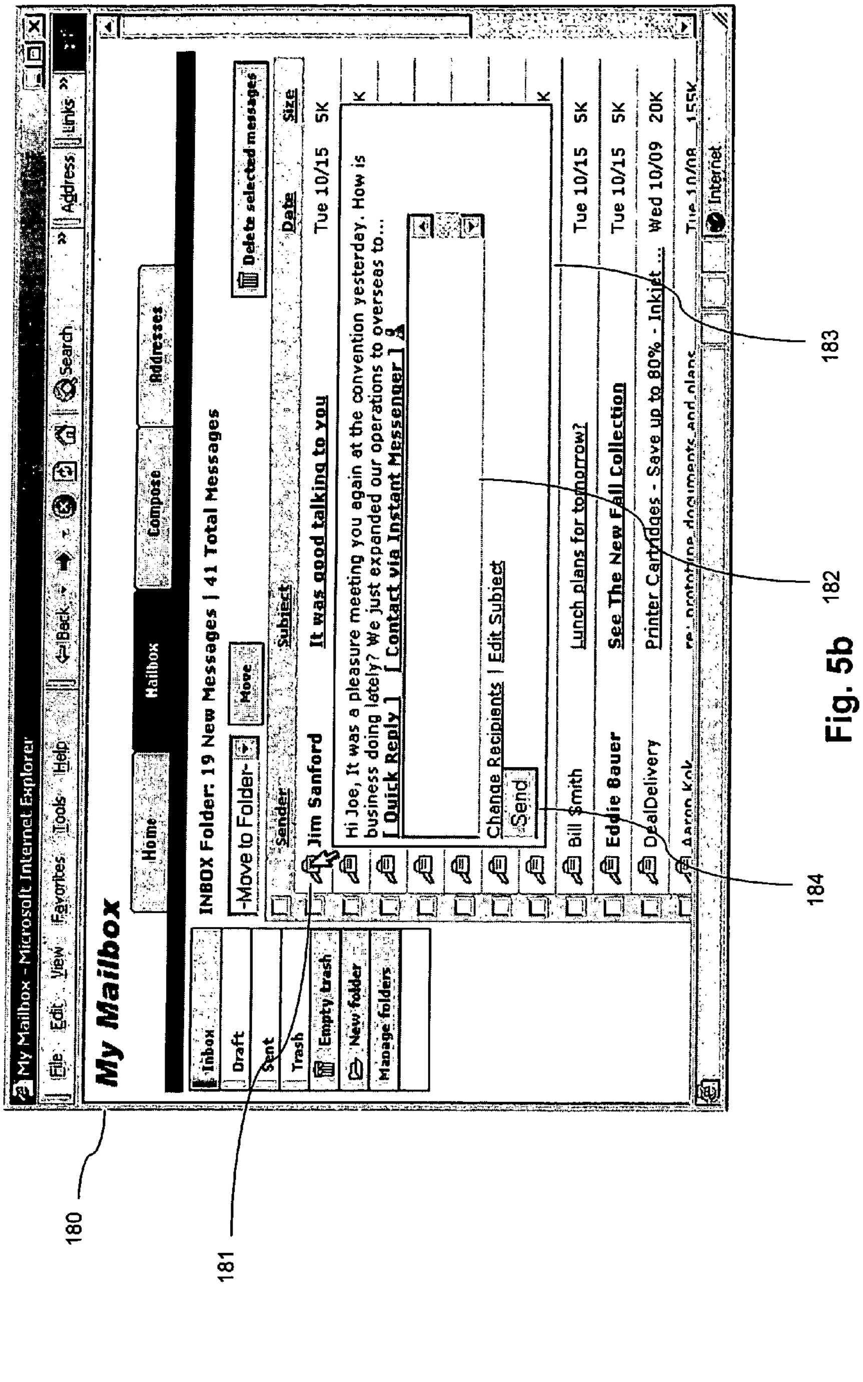
FIG. 5*b* illustrates a preview window in accordance with the invention rendering a summary of an e-mail with input fields for replying to the sender from the preview window.

FIG. 5*b* shows an example of an inbox view 180, similar to FIG. 5*a*, but with a quick reply window or text box 182 opened within the preview window 183. Upon the user clicking the "[Quick Reply]" link in the preview window, the preview window may be expanded with the small text inbox box 182 opened and with functionality to instantly reply to the sender with any text entered into the box upon pressing a send 184 button below the box. Similarly if the user had pressed on the "[Contact via Instant Messenger]" link, a similar text box would appear where a message entered into the box would get sent to the recipient via an instant messenger.

When the user has entered a text in the input box 182 and clicked on the send button 184, the send button may trigger the execution of a JavaScript routine that communicates (using mechanisms that may be specified in the preview window communications section) with the e-mail application to send the reply, without the need to refresh the page or inbox view or to open the e-mail.

When using the "Contact via Instant messenger" link, a similar mechanism may be used by the preview mechanism to send the message, but in a preferred embodiment, a plug-in of the instant messenger component may be embedded within the preview window using mechanisms such as ActiveX or other similar mechanisms familiar to those skilled in the art. In this event, there is no need to contact the e-mail application after an instant messenger message is sent. The plug-in merely communicates directly to the appropriate Instant Messaging server on the network. In a preferred embodiment of the invention, the "instant messenger" option may only be available if the e-mail address of the sender of the e-mail is already in the recipient's address book, as identified, for example, by an instant messenger nickname.

Figure 6:
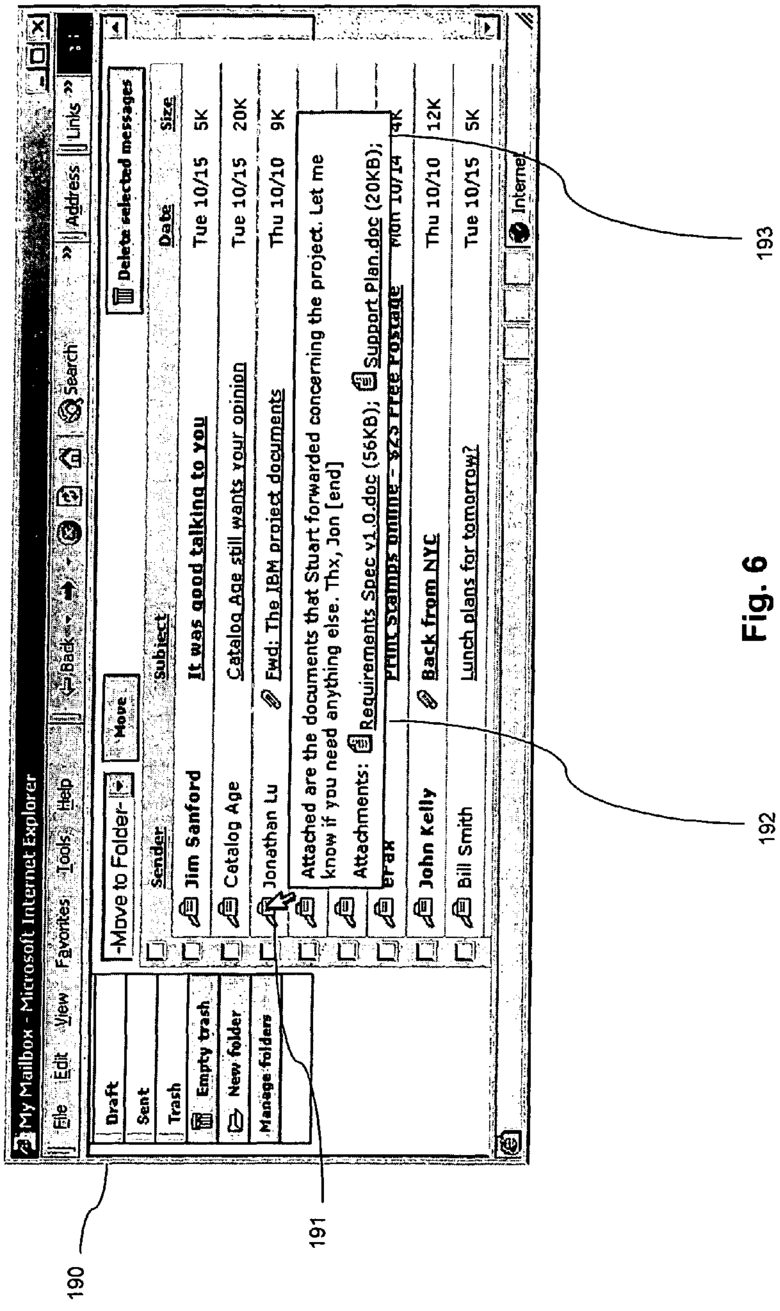
FIG. 6 illustrates a preview window in accordance with the invention rendering a summary of an e-mail with links to access attachments of the e-mail.

FIG. 6 shows an example of an inbox view 190 following the preview trigger 191 being activated and the preview window 193 being opened. The e-mail corresponding to the activated preview may contain two file attachments, as shown. In this embodiment of the invention, links may be provided with the preview window to access the attached documents directly from the preview window. Alternatively, certain attachments may, if desired, be rendered within the preview window immediately upon opening the preview window without any user activation of a link. The invention advantageously allows users to easily extract or retrieve attachments to e-mails without having to open the e-mail first. In a web-based e-mail client, the mechanism to retrieve an attachment to an e-mail may be a URL to the e-mail server that, when accessed, will download the document that is attached to the e-mail message to the user's computer via the web browser. In the standalone e-mail client, the link will preferably communicate with the e-mail client (as described previously) to extract the file from the e-mail and launch an appropriate reader to render the attachment. If no default reader exists, a prompt may ask the user if he/she wants to save the file or to specify an application under which the attachment will open. Such mechanisms to extract e-mail attachments are well known to those skilled in the art.

Figure 7A:
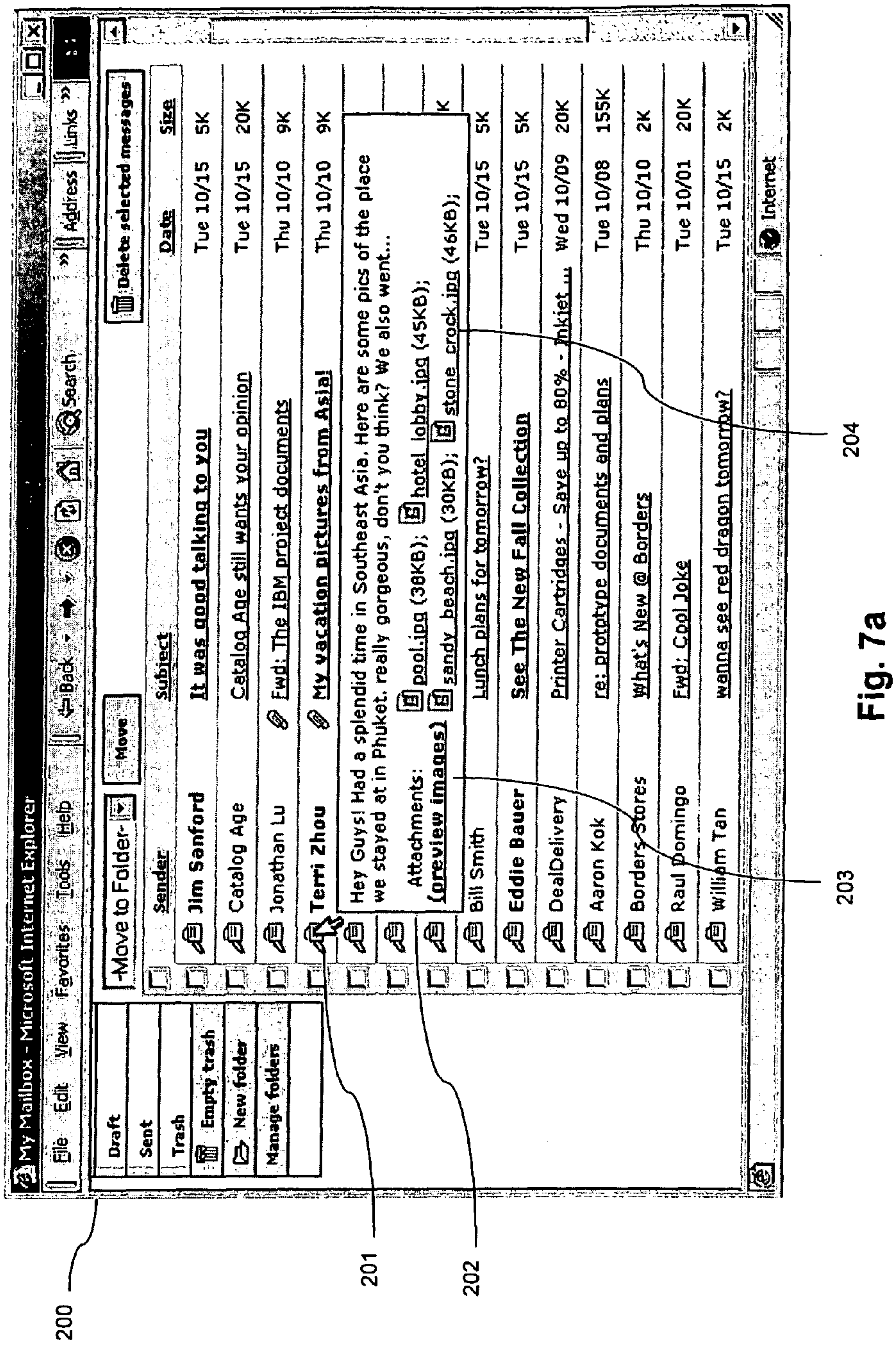
FIG. 7*a* illustrates a preview window rendering a summary of an e-mail with links to access images in the e-mail.

The invention may also be used for previewing multi-media content, such as video or images and/or audio in the preview window. Multi-media content such as images and audio may be included within the email or within an attachment, or downloaded from a remote server, and rendered. FIG. 7*a* shows an example of an inbox view 200 with the preview trigger 201 activated and the preview window 202 opened and overlaying the e-mail listing. In the example shown, the e-mail corresponding to the activated preview contains four image (.jpg) attachments. The preview window may display control mechanisms such as links 204 to all four images at the bottom of the preview window, such that if the user clicks on any of the links, the corresponding images will be downloaded to the user's computer (as by using mechanisms explained in connection with FIG. 6) from a remote server. When an e-mail contains image attachments, an additional link "(preview images)" 203 may be present in the preview window. If the user clicks on this link, it may expand the preview window to display a smaller sized version of the images ("thumbnails", for instance) in the e-mail.

Figure 7B:
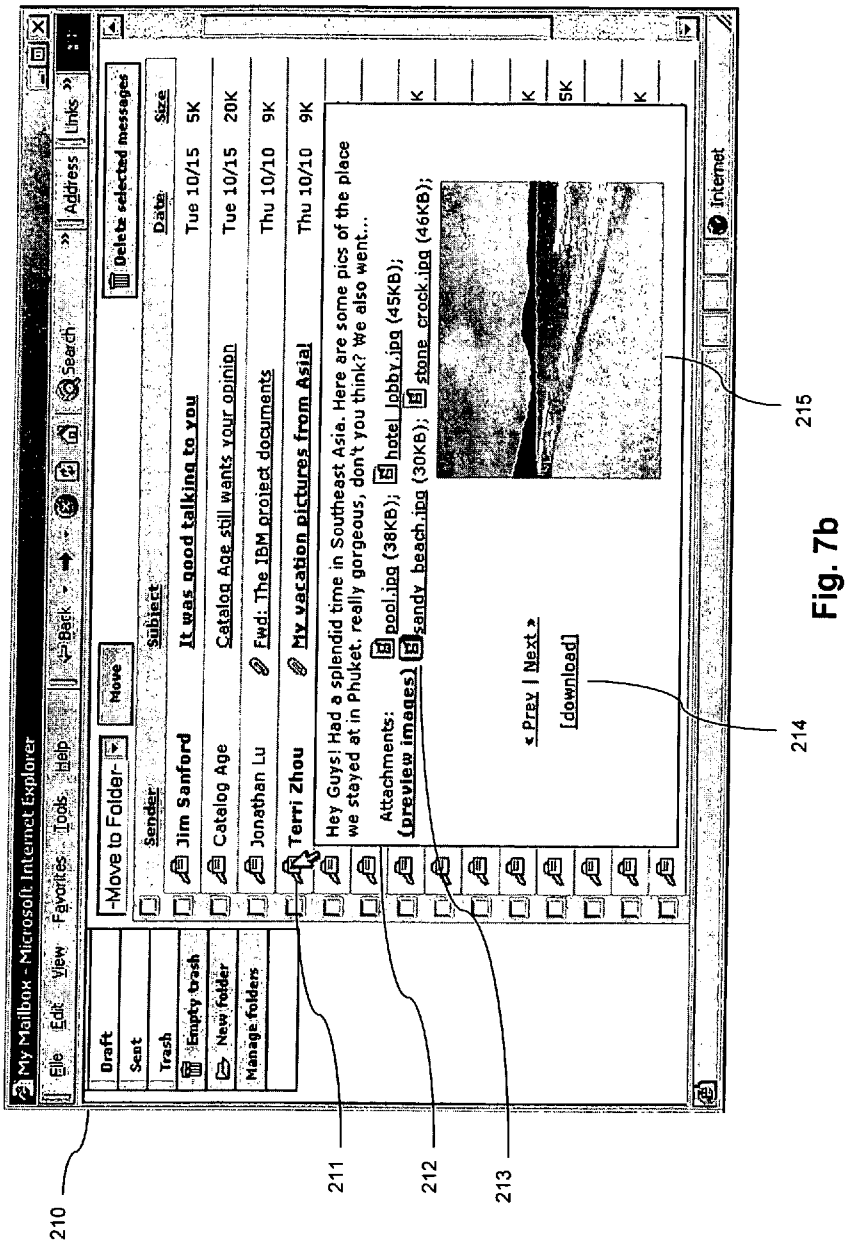
FIG. 7*b* illustrates the preview window of FIG. 7*a* rendering an image within the preview area.

FIG. 7*b* shows an inbox view 210 of FIG. 7*a* following activation of the preview images link 203 by the user. As shown, the preview window 212 has expanded to show a smaller version 215 of one of the images 213 of the e-mail. In this embodiment of the invention, in the preview images mode, the links to the pictures 213 preferably do not download the images to the user's computer, but rather merely instruct the preview window to load an image 215 into the preview space within the preview window from the e-mail application. The preview window 212 may also contain mechanisms such as links 214 that control the sequence of images shown, including a link to extract (download) a full-scale version of the image. This advantageously allows the user to browse the image attachments without opening the e-mail and before deciding on which image to download or save. In an alternative embodiment, the invention may immediately display images as a slideshow within the preview window upon opening the preview window without a user having to activate a link.

In an alternate embodiment, the invention may allow preview of images stored on a remote server and not embedded in the e-mail itself as attachments. In this case, the e-mail may contain an identifier that specifies that the images are stored on a remote server (such as a photo sharing website), from which the application may retrieve the list of images to be displayed in the preview window slideshow.

Figure 8A:
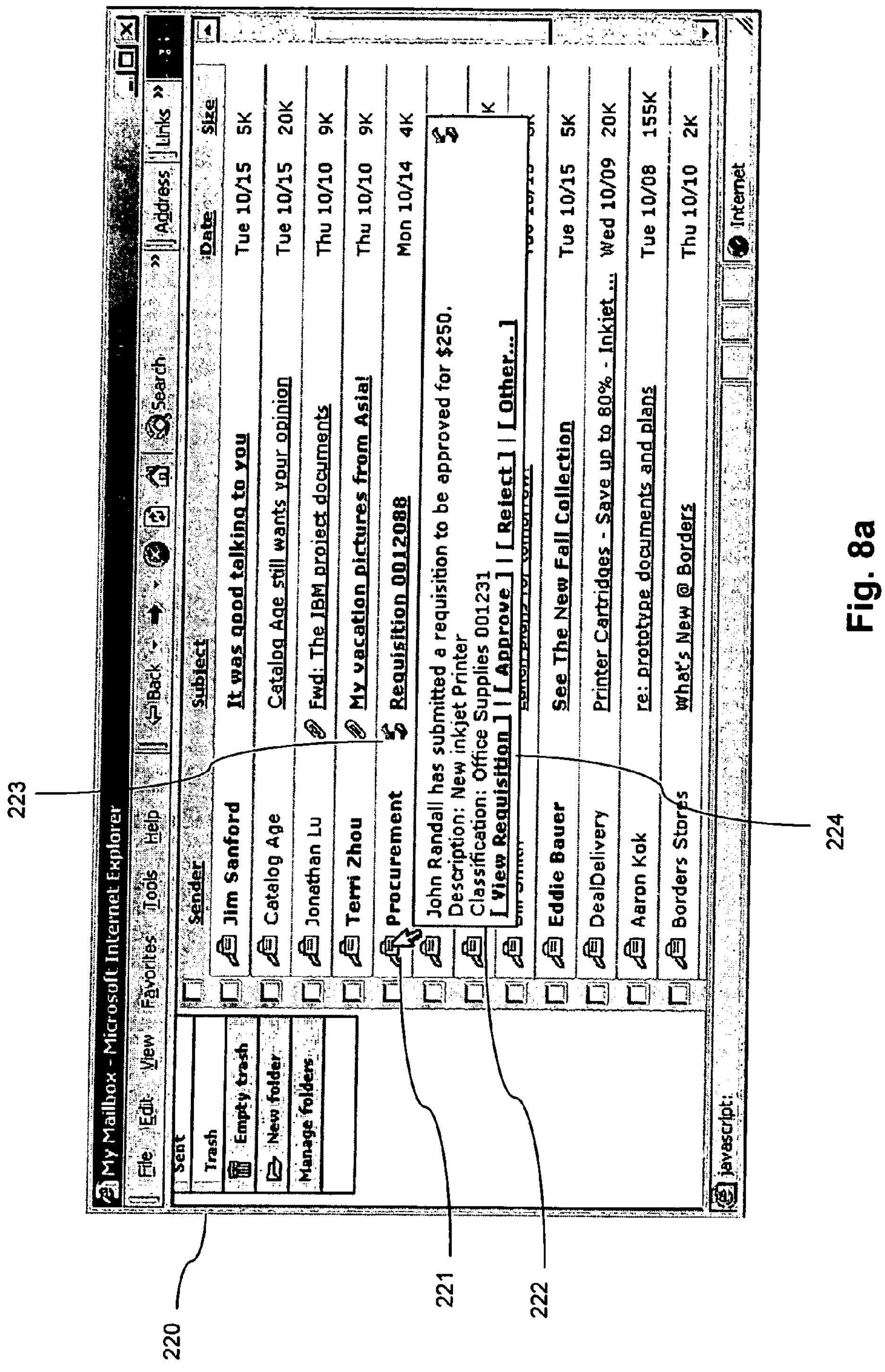
FIG. 8*a* illustrates a preview window containing an executable that may be executed from special instructions within an e-mail.

FIG. 8*a* shows an inbox view 220 following activation of the preview trigger 221 and with the preview window activated and visible 222. The e-mail of the activated preview may contain special preview instructions which direct e-mail applications that are capable of interpreting the instructions and are preview capable to populate the preview window 212 with an application with which the user can interact. The e-mail application may also add an icon 223 to notify the user that this e-mail contains special preview instructions. This icon 223 may be customized so that different icons are displayed for different types of preview instructions. The application may be a form of a browser executable application, such as Macromedia Flash or Java applet, or in the case of the standalone application, the preview window may even support other types of non-browser executable applications. The preview window may also support other types of executables, such as JavaScript, that are not retrieved in a binary form.

In the example shown in FIG. 8*a*, the e-mail is part of a workflow process of a procurement system, e.g., as available from Ariba, where the purpose is to obtain approval of a requisition. The requisition referred may be an online form that a department within an organization sends to the purchasing department using the procurement application, and which contains details of materials to meet requirements, replenish stocks or obtain materials for specific jobs or contracts. The person receiving the e-mail may be an officer within the purchasing department that has authorization to approve or deny the requisition.

As shown, the e-mail may contain instructions within its header that directs the e-mail client to load an application within the preview window to allow the user to act upon the requisition without leaving the preview window or even having to open the e-mail. The e-mail header may contain the requisition number, as well as an identifier that the instruction is of a particular type, e.g., application=procurement_e-mail_plug-in:

X-PreviewInstruction: application=procurement_e-mail_plug-in;requisition_guid=A309EF012BC290912390; server=myserver.com The e-mail client (in the standalone client) or the e-mail server (in the web-based e-mail) will detect the application type “procurement_e-mail_plug-in” and determine if it is capable of handling the instructions of the indicated application “procurement_e-mail_plug-in”.

In a preferred embodiment of the invention, the e-mail applications contain the necessary functionality to handle the application type “procurement_e-mail_plug-in”, and load a Java applet within the preview window that takes the parameters of the X-PreviewInstruction. The Java applet may then connect with a server, e.g., myserver.com, and retrieve the requisition matching a requisition_guid of A309EFO12BC290912390. Upon receiving the requisition information from the server, the Java applet may then display within the preview window 212 the information in the requisition that the user needs in order to approve the requisition. The information preferably includes a link 224 to view the entire requisition and actions to take such as “approve” or “reject”. In a preferred embodiment of the invention, the e-mail application may be extended by installing new plug-ins. The e-mail application is able to handle and load various proprietary components within the preview window as specified by the preview instructions in the header.

The invention improves the efficiency of business workflow because it is not only unnecessary to open the e-mail to see information regarding the requisition, a user does not have to manually launch an application or visit another URL but can interact through the preview window with the business application, which may, for example be a Java application.

In another embodiment, the invention may have a more generic preview instruction and the e-mail application may only know of a URL to load the preview content. This is similar to loading a web page in a browser:

X-PreviewInstruction: application=browser;url=http://myserver.com?type=in_preview&requisition_guide=A3

09EF012BC290912390

In this case, any content that is browser-readable may be loaded within the preview. It would be advantageous to specify certain settings in the URL parameters, such as the preview window height and width to ensure that the loaded content will fit within the preview window. Using this approach, it is not necessary to install any plug-ins within the client. In the case of a standalone e-mail application, the advantage of having an e-mail plug-in as opposed to a generic browser plug-in is that the e-mail plug-in, such as the before-mentioned Java-based procurement_e-mail_plug-in, is that the plug-in is installed locally and will be able to operate without connectivity to a network. In the absence of any network connection, the plug-in may store any instructions that it receives from the user, and send them to the server when a network connection is later detected.

Another advantage is that the e-mail application is able to auto-install new plug-ins should it determine that the application itself is not equipped to handle the content, and a plug-in installation URL may be provided within the preview instruction, e.g., X-PreviewInstruction: application=procurement_e-mail_plug-in;plug-in_install_url=http://myserver.com?action=get_plug-in;requisition_guid=A309EF012BC290912390;server=myserver.com In this instruction the plug-in_install_url parameter directs the e-mail client to retrieve a plug-in installer from a server on the network. This plug-in installer may conform to plug-in architectures such as ActiveX plug-ins for browsers or other plug-in architectures familiar to those skilled in the art. Once installed, the e-mail application will not need to retrieve the plug-in installer from the server on the network the next time the e-mail application encounters e-mails with headers corresponding to the plug-in. Preferably, the e-mail application notifies the user to obtain consent before installing the plug-in.

In regards to the “X-PreviewInstruction” instructions, in an alternate embodiment of the invention, the instructions may be embedded in an attachment in the body of the e-mail. The advantage of embedding the instructions in an attachment is that this allows the instructions to contain more content, potentially eliminating the need to acquire more information from a remote server. The e-mail application can then determine the content type of the application through either the file extension of the attachment or the mime type.

Figure 8B:
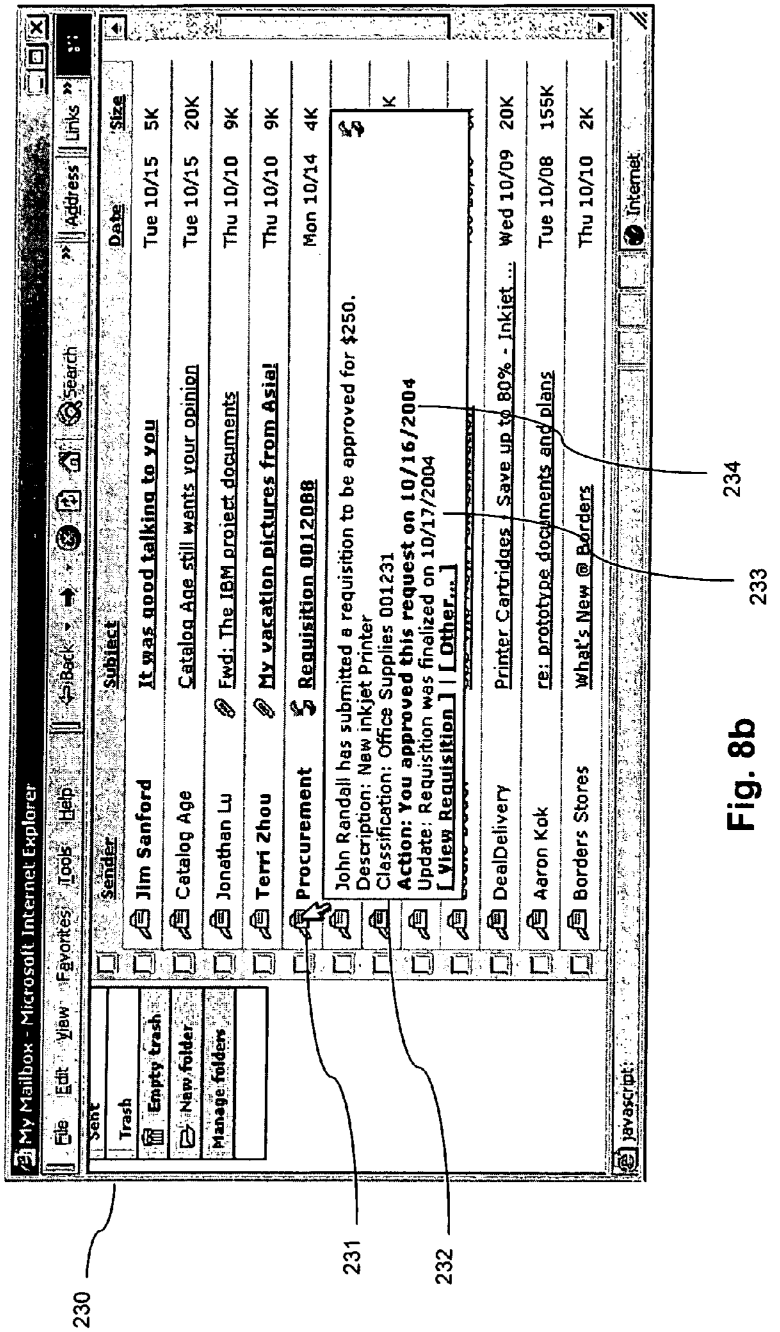
FIG. 8*b* illustrates the preview window of FIG. 8*a* following a response to an action that the recipient has taken.

FIG. 8*b* shows the inbox view 230 of the inbox of FIG. 8*a* following updating of the requisition. The activated preview window 232 now shows updated information 234 and 233 which reflects actions that the recipient took on the e-mail. The figure shows the case where the user had previously clicked on the “approve” link in FIG. 8*a* and, as a result, the Java applet within the preview window 222 sent the action to the server and the action was recorded. FIG. 8*b* shows the preview window of the same e-mail at a later time where further actions on the requisition have been taken, and the content of the preview window 232 reflects the changes to the requisition. This occurs because the Java applet loads the requisition information in real-time when network connectivity is present, or stores the previous state if the application contains the capability to store state information. Therefore, unlike a normal e-mail where the user has to open the e-mail to see its contents, a plug-in-enabled preview window allows the user can to view updates and the status of actions by merely activating the preview window without having to receive follow on e-mails, confirmation e-mails, launching another application, or visiting a web-page to see these updates.

Figure 12:
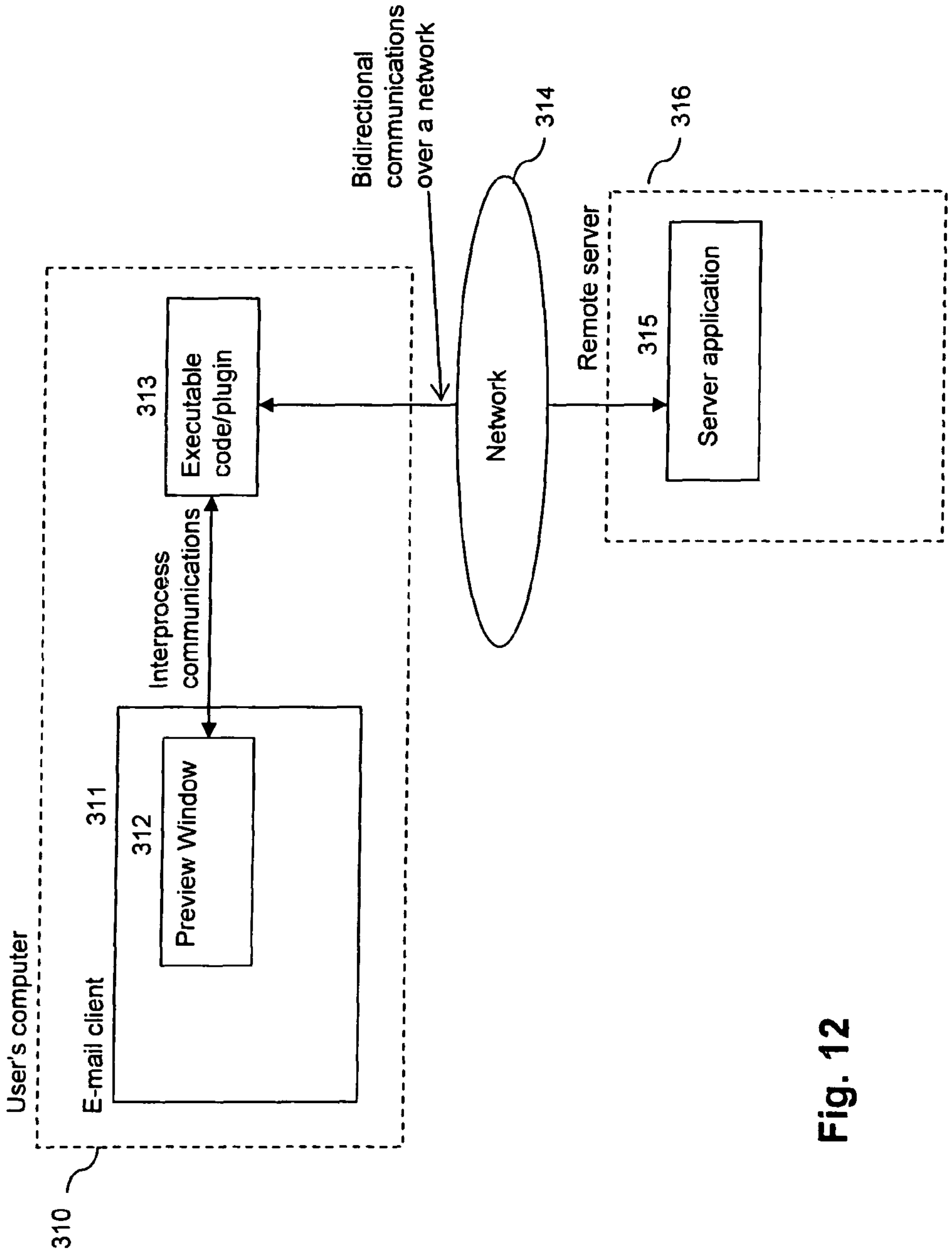
FIG. 12 is a diagram showing various processes in accordance with the invention for executing executables within a preview window.

FIG. 12 illustrates the logical components of the embodiment of the invention shown in FIGS. 8*a*-8*b*. The user's computer 310 may be running an e-mail client 311 (or a web-browser displaying the user interface of a web-based e-mail application) with an activated preview window 312. The preview window 312 may contain a running executable e-mail plug-in 313 that communicates with the preview window via inter-process communications. The executable e-mail plug-in 313 may have a user interface, as shown in FIGS. 8*a*-8*b*, or may have a hidden plug-in residing within the preview window 312. The executable e-mail plug-in may optionally communicate via the network 314 with a server application 315 located on a remote server 316 to obtain, for example, application specific information that is related to the preview instructions that are embedded within the e-mail associated with the preview window being displayed. As will be apparent to those skilled in the art, no plug-in is necessary should the functionality be directly embedded into the e-mail application itself.

In a preferred embodiment of the invention, the icon 221, or trigger, (see FIG. 8*a*) may change state, e.g., color or image, should information related to the content of the e-mail be changed. For instance, in the requisition example described above, should another recipient change the status of the requisition, the icon may change to indicate that a change has occurred. The recipient may hover over the trigger to activate the preview window and view the changes to the requisition. This capability may be achieved through an application that runs in the background and connects to a third party application that queries whether a status on an item has changed. Alternatively, if the item is time sensitive, the icon may change to reflect this time sensitivity and indicate that the time to take action is nearing or has passed.

Another utility of the invention is in connection with calendaring. Currently Microsoft Outlook allows users to send a meeting request that is basically an attachment containing VCalendar (text/calendar MIME type) instructions should the recipient have a client application that has the capability to interpret VCalendar instructions. These notify the recipient that the sender has requested a meeting, and allow the recipient to automatically schedule the meeting in his calendar. Unlike current approaches, the e-mail application of the invention may allow the recipient to accept, deny or reschedule the meeting using the preview technology described above, without opening the e-mail itself from the preview window.

Figure 9A:
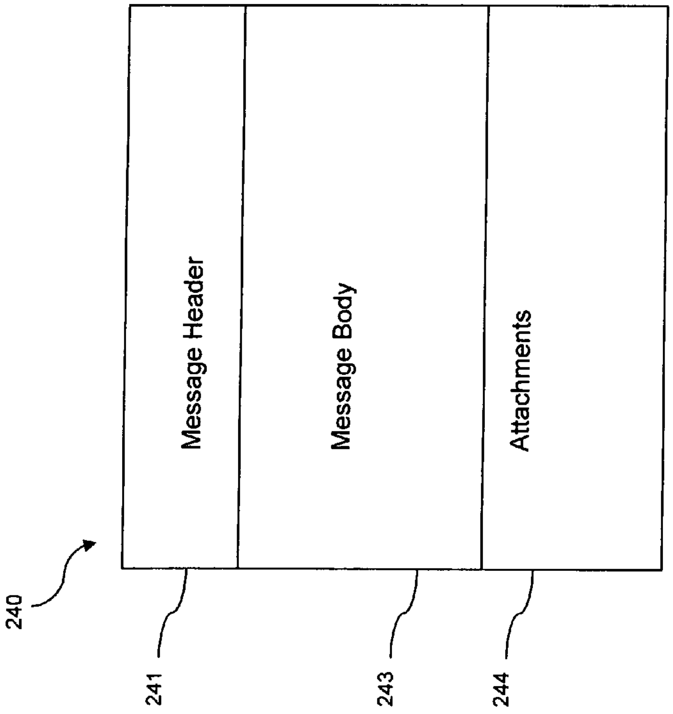
FIG. 9*a* is a diagrammatic view of different parts of an e-mail having attachments.

FIG. 9*a* illustrates the different logical parts of an e-mail with attachments 240. An e-mail 240 with an attachment is usually sent with the content-type set to "multipart/mixed", signifying that there are more than one type and parts of content within the e-mail. In a typical e-mail message with attachment there will be a header 241, a body 243, and attachment(s) 244. There may be more than one body parts as e-mails generally support dual format bodies, html and text, referred to as multipart/alternative e-mails. There may also be more than one attachment within the e-mail. The text below illustrates an example of an e-mail with a gif image attachment (the binary portion of the gif file has been truncated for brevity.)

```
From: "Jane Sender" <jane@sender.com>
To: jwebb@yahoo.com
Subject: Picture of my puppy...
Date: Sat, 26 Oct 2002 09:20:17 +0000
MIME-Version: 1.0
Content-Type: multipart/mixed;
  boundary="----=_NextPart_000_0036_01C26FEC.EE6C38B0"
This is a multi-part message in MIME format.
------=_NextPart_000_0036_01C26FEC.EE6C38B0
Content-Type: text/html;
Content-Transfer-Encoding: quoted-printable
<html>
<STRONG>
Hello Joe,
</STRONG><BR>
Here is a picture of my puppy!<BR><BR>
Talk to you soon!<BR>
Regards,<BR>
Jane Sender
</html>
------=_NextPart_000_0036_01C26FEC.EE6C38B0
Content-Type: image/gif;
      name="puppy.gif"
Content-Transfer-Encoding: base64
Content-Disposition: attachment;
      filename="puppy.gif"
R0lGODlhzQKaAvcAAP//////zP//mf//Zv//M///AP/M///MzP/Mmf/MZv/
MM//MAP+Z//+ZzP+Z
mf+ZZv+ZM/+ZAP9m//9mzP9mmf9mZv9mM/9mAP8z//
8zzP8zmf8zZv8zM/8zAP8A//8AzP8Amf8A
Zv8AM/8AAMz//8z/zMz/mcz/Zsz/M8z/AMzM/
8zMzMzMmczMZszMM8zMAMyZ/8yZzMyZmcyZZsyZ
M8yZAMxm/8xmzMxmmcxmZsxmM8xmAMwz/
8wzzMwzmcwzZswzM8wzAMwA/8wAzMwAmcwAZswAM8wA
AJn//5n/zJn/mZn/Zpn/M5n/AJnM/5nMzJnMmZnMZpnMM5nMAJmZ/
5mZzJmZmZmZZpmZM5mZAJlm
/5lmzJlmmZlmZplmM5lmAJkz/
5kzzJkzmZkzZpkzM5kzAJkA/5kAzJkAmZkAZpkAM5kAAGb//2b/
[truncated for brevity]
------=_NextPart_000_0036_01C26FEC.EE6C38B0--
```

Figure 9B:
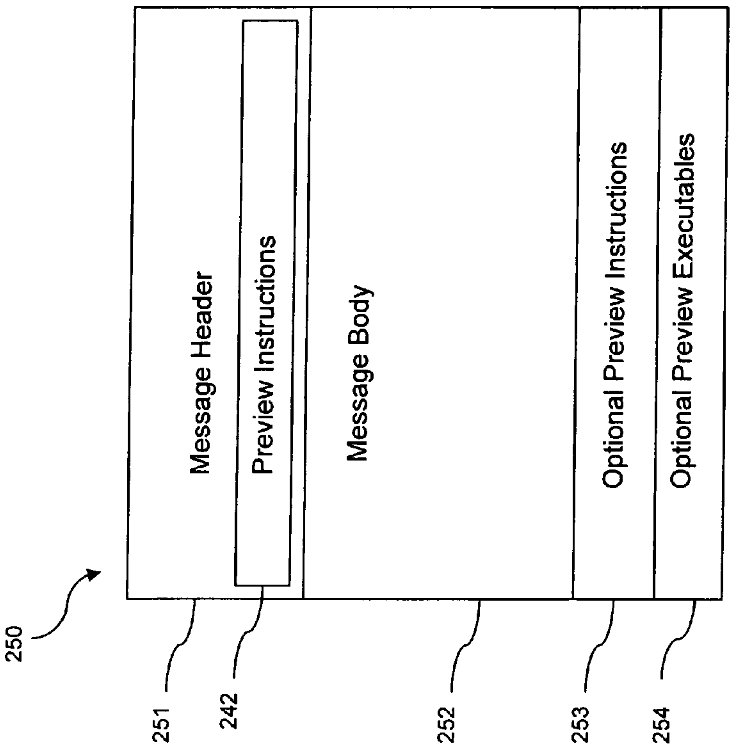
FIG. 9*b* shows a specific embodiment of a preview-enhanced e-mail format and possible locations for preview instructions within the e-mail.

FIG. 9*b* illustrates areas within an e-mail 250 where special preview instructions 242 may be embedded. The preferred method to embed the preview instructions is to use an X-header, i.e., X-PreviewInstruction, in the header 251 of the e-mail. The preview instructions may also be included as an attachment 253 within an e-mail with a content-type of multipart/mixed, and the instructions may have a content-type of "application/x-preview-instructions". The instructions in the header may notify the e-mail application with an e-mail plug-in to populate the preview window, and the e-mail plug-in may extract additional instructions from the attachment 253. This allows the e-mail application to delegate the parsing and extraction of the preview instructions in the attachment part to the e-mail plug-in. Optionally, the e-mail plug-in installer may also come as part of the e-mail as an attachment 254.

Figure 10:
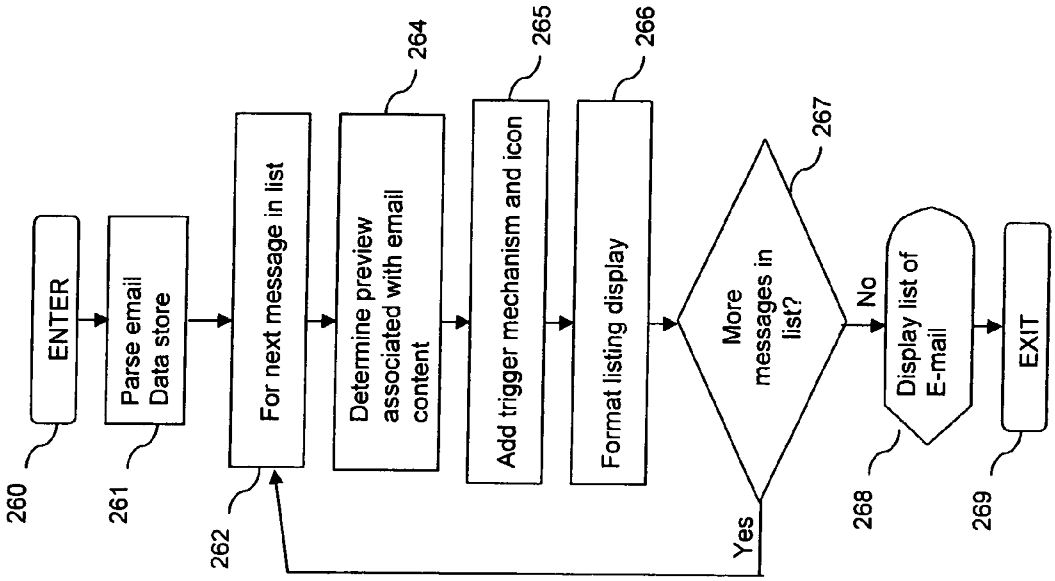
FIG. 10 is a flowchart illustrating an overview of a process in accordance with the invention for displaying a listing of e-mail with the triggering mechanisms.

FIG. 10 illustrates a process in accordance with the invention for generating a listing of e-mails in the inbox view with triggers. The process begins at 260 when a user launches the e-mail client. When the user interface generates the listing of e-mails, the application may parse the e-mail data store at 261. In the web-based e-mail application, this parsing takes place at the server. In a standalone e-mail application, it may involve parsing a local e-mail storage or a remote e-mail storage through an e-mail retrieval protocol such as IMAP or POP. Each e-mail in the data store may be parsed at 262 for information such as sender's name, subject line, date and other information, including whether the e-mail contains attachments or preview instructions, and to determine at 264 which preview window mechanism to associate with the e-mail. The preview mechanism and icon may be then appended to the e-mail list view at 265, and the list view formatted for display to the user at 266. Upon determining that there are no more messages in the data store to process at 267, the inbox view is displayed to the user at 268.

Figure 11A:
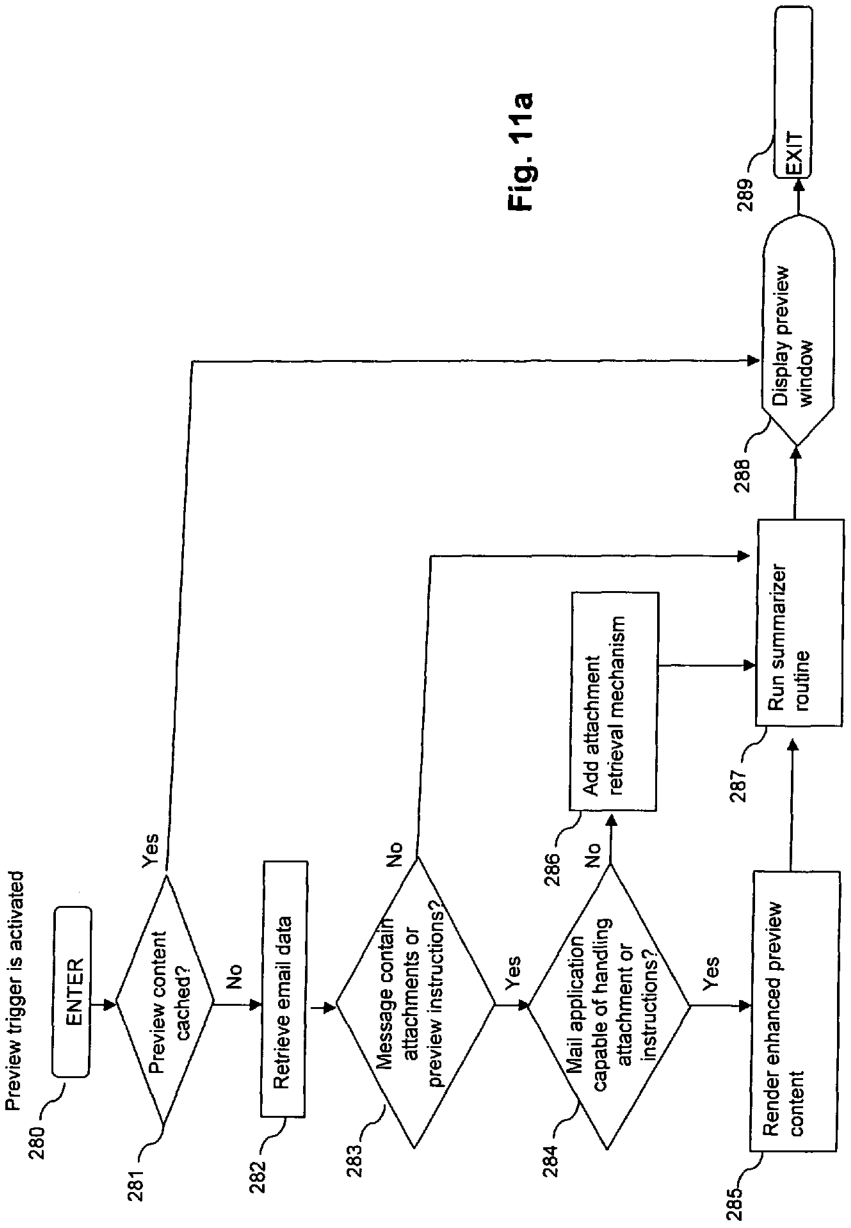
FIG. 11*a* is a flowchart illustrating an overview of a process in accordance with the invention for displaying a preview when a preview trigger is activated.

FIG. 11*a* illustrates a preferred process for activating the preview window. As previously described, the user may activate the preview window by moving the mouse over the preview trigger 155 (FIG. 4*a*) or 164 (FIG. 4*b*) in an e-mail listing. After the list of e-mails 150 (FIG. 4*a*) or 160 (FIG. 4*b*) has been displayed to the user, the user may move his mouse over a triggering icon, i.e., preview trigger, 164 to activate a preview. This will cause the preview window to begin initializing, as shown at step 280 in FIG. 11*a*. The process may check at 281 to see if the preview content for this preview window has already been cached. If the content has already been cached, for example the content may already reside as a hidden div layer, the preview window may be displayed to the user at 288.

Alternatively, the preview window content may be retrieved, processed and/or cached during the initial generation of the e-mail listing in the inbox. Then, the preview window may simply display the content when the preview trigger is activated.

If the preview content is not cached, then the process may retrieve the e-mail from the data store at 282. The process may then inspect the message at 283 to determine if the e-mail-contains attachments or preview instructions. If not, a "summarizer" routine may be invoked at 287. The summarizer routine preferably summarizes and sizes the e-mail body content to fit the preview window. In a preferred embodiment of the invention, the summarizer routine may truncate the text in the e-mail body to a predetermined number of characters, e.g., 200 characters, that can fit within the preview window. In the case of e-mails that only contain HTML text, the summarizer routine may filter and strip out the HTML tags and truncate and display the remaining plain text words to a number of characters that will fit within the preview window space. Certain languages, for example, support conversion of HTML documents to plain text using a function such as "strip_tags( )" of PHP. The preview window may be then displayed to the user at 288.

If the e-mail message contains attachments or preview instructions (283), the e-mail application may check at 284 to see if it has the capability to handle or render the attachments or instructions. If this capability does not exist, as in the case, for example, where the preview instructions are not understood or the attachment is not a recognized type, then the application may add a link at 286 within the preview window that when activated will retrieve the e-mail attachment (if any) from the e-mail. The summarizer routine may be invoked at 287 to summarize any text or HTML content in the body of the e-mail before displaying the preview window at 288. If the e-mail application is capable of handling or rendering the attachment(s) or preview instructions (284) within the e-mail, an appropriate routine may be invoked at 285. In the case of e-mail attachments, an example of a specialized rendering routine may be to display previews of image attachments within the preview window, as shown in FIG. 7*a* and FIG. 7*b*, where a plurality of images may be displayed as by a user controllable slideshow. The summarizer routine may be then invoked at 287, and the preview window displayed at 288. If the content to be summarized is an image, the image may simply be displayed using a more restrictive dimension in the "img tag" so that the browser resizes the image in real time or a routine to resize the image may be used such as using the library ImageMagick. There are other third party components that either resize or convert proprietary formats into images.

Preferably, the e-mail application may also display previews of attachments in other ways. For example, the e-mail application may contain a plurality of file format converters that can convert document types such as Microsoft Power Point slides into a series of images that can be displayed in the preview window, or convert document types such as PDF and MS Word. Alternatively, the e-mail application may use JavaScript to detect whether the user's browser or e-mail application supports specialized plug-ins (such as video or audio players), and to invoke those plug-ins to render the attached contents within the preview window.

The summarizer routine 287 preferably also adds the routines necessary to enter a reply to the sender of the e-mail, as shown in FIG. 5*a* and FIG. 5*b*. If the sender has an instant messenger account (through an instant messenger e-mail plug-in or through the user's address book), it may be used to contact the sender through instant messenger. Other known mechanisms to integrate instant messenger capabilities within web pages may be used to integrate the instant messenger capability within the preview window.

Figure 11B:
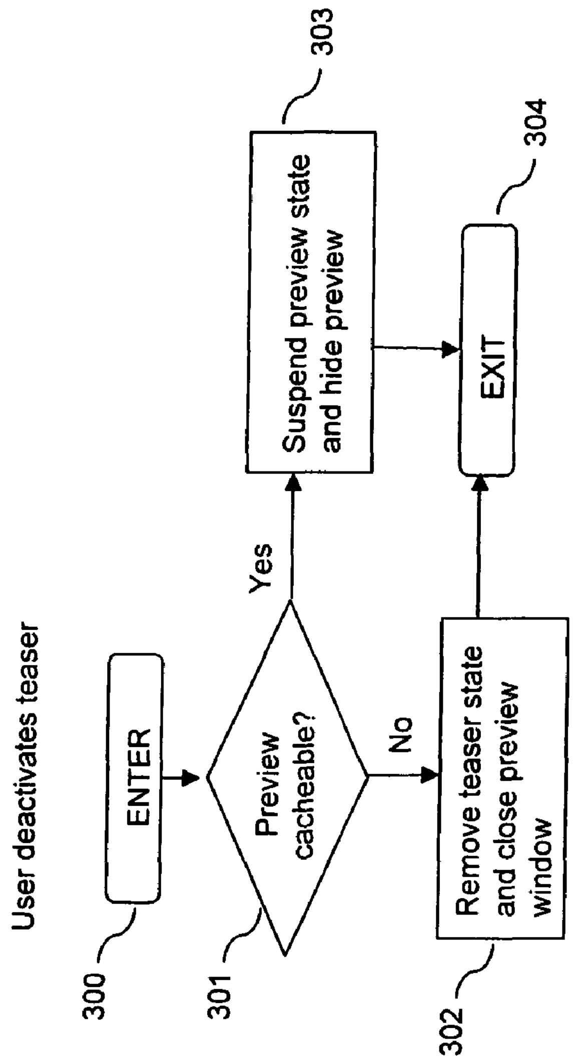
FIG. 11*b* is a flowchart illustrating an overview of a process in accordance with the invention for hiding a preview when a preview trigger is deactivated.

FIG. 11*b* illustrates a preferred process in accordance with the invention for deactivating the preview window in an e-mail listing. The user may deactivate the preview window by moving the mouse away from the preview window trigger 172 (FIG. 5*a*) or the preview window 174. This will cause the preview window to begin the process of deactivation at 300.

The process may check to see if the current preview window is cacheable at 301. For example, previews that contain summaries of text or html e-mails such as shown in FIG. 5*a-b*, and previews that contain links to attachments to documents as shown in FIG. 6, or images as shown in FIG. 7*a-b* that are unlikely to change, may be extracted and cached. If the preview is cacheable, then the preview may be set to hide itself, as by changing the visibility style attribute to "hidden" in the DIV for a web-based e-mail application or setting the visibility attribute of the preview window to "hidden" in a standalone application. If the preview window had been extended as shown in FIG. 5*b* or FIG. 7*b*, then the preview may be collapsed until the next time the preview is shown.

If the preview is not cacheable, then the preview window's content and window state may be reset and removed at 302. The e-mail application may make the decision on whether a preview should be cached or not. For example, a preview that contains a plug-in or an executable such as a Java applet may be deemed to take up too much processing resource and should not be cached. Therefore, the window may be deleted and the resource released.

While the foregoing has been with reference to specific embodiments of the invention, it will be appreciated that changes may be made to these embodiments without departing from the spirit and principles of the invention, the scope of which is defined in the appended claims.

The invention claimed is:

1. A method of enhancing an e-mail user interface, comprising:

associating a trigger with an e-mail in an inbox view listing of e-mails;

upon activation by a user of said trigger, opening a temporary window solely for said e-mail on said inbox view, said temporary window being positioned dynamically to appear at a location proximate to said trigger in said inbox view to provide to the user a visual connection to said email;

rendering within said temporary window a portion of text of a body of said e-mail, said text being displayed so as to fit within said temporary window without scrolling;

providing user controls within the temporary window, said controls including a clickable reply control allowing a user to reply to the e-mail;

said temporary window being expanded upon said reply control being clicked and a text box with a send control being displayed within said temporary window to allow the user to enter reply text and send the reply text to a sender of the e-mail upon the send control being clicked.

2. The method of claim 1, wherein said temporary window on said inbox view is automatically closed upon one of deactivation of the trigger associated with said e-mail, after a predetermined time has elapsed, or upon the user activating another trigger associated with another e-mail.

3. The method of claim 1, wherein said sending comprises communicating with an e-mail application to forward said text entered into the text box as an e-mail.

4. The method of claim 1, wherein said sending comprises communicating with an e-mail application that communicates with an instant messenging server to forward said text.

5. The method of claim 1, wherein said rendering comprises automatically rendering said text upon opening of the temporary window.

6. The method of claim 1, wherein said trigger comprises an icon adjacent to said e-mail, and said method comprises activating said trigger upon positioning a cursor relative to said icon.

7. The method of claim 6 further comprising changing the appearance of said icon in response to information referenced by the e-mail being modified by an entity other than the user of the email application after said email has been delivered to the inbox of the user.

8. An enhanced e-mail user interface for an e-mail client application on a computer comprising:

computer program storage storing executable instructions for controlling the computer to provide:

a trigger associated with an e-mail on an inbox view listing of e-mails displayed on said computer;

a temporary window created solely for said e-mail on said inbox view listing upon activation of the trigger by a user, the temporary window being positioned dynamically to appear at a location proximate to said trigger in said inbox view to provide to the user a visual connection to said e-mail;

a portion of text of a body of said e-mail being rendered so as to fit within said temporary window without scrolling;

user controls within said temporary window, including a clickable reply control allowing the user to reply to the e-mail; and said temporary window being expanded upon said reply control being clicked and a text box with a send control being displayed within said temporary window to allow the user to enter reply text and send the reply text to a sender upon the send control being clicked.

9. The interface of claim 8 further comprising communicating with an e-mail application to send the text entered into the text box.

10. The interface of claim 9 further comprising a communicating with an instant messenger to enable sending the text entered into the text box.

11. The interface of claim 8, wherein said e-mail comprises an e-mail header, and said trigger comprises instructions in said header that direct the e-mail application to load another application into the temporary window to enable interaction with the e-mail.

* * * * *